US008375322B2

(12) United States Patent
Delia et al.

(10) Patent No.: US 8,375,322 B2
(45) Date of Patent: Feb. 12, 2013

(54) CONTEXT SENSITIVE PAGING

(75) Inventors: Wayne Michael Delia, Poughkeepsie, NY (US); Glenn Stuart Knickerbocker, Kingston, NY (US)

(73) Assignee: International Busniess Machines Corporation, Armonk, NY (US)

( * ) Notice: Subject to any disclaimer, the term of this patent is extended or adjusted under 35 U.S.C. 154(b) by 957 days.

(21) Appl. No.: 12/142,856

(22) Filed: Jun. 20, 2008

(65) Prior Publication Data

US 2009/0319942 A1    Dec. 24, 2009

(51) Int. Cl.
    *G06F 3/048* (2006.01)
(52) U.S. Cl. ........................................... 715/785
(58) Field of Classification Search ............... 715/785, 715/856
    See application file for complete search history.

(56) References Cited

U.S. PATENT DOCUMENTS

| 5,283,864 | A  | 2/1994  | Knowlton     |
| 5,510,808 | A  | 4/1996  | Cina         |
| 5,553,225 | A  | 9/1996  | Perry        |
| 5,623,588 | A  | 4/1997  | Gould        |
| 6,157,381 | A  | 12/2000 | Bates        |
| 6,509,907 | B1 | 1/2003  | Kuwabara     |
| 6,583,798 | B1 | 6/2003  | Hoek         |
| 6,647,360 | B2 | 11/2003 | Graham et al.|
| 7,415,666 | B2 * | 8/2008  | Sellers et al. ............... 715/251 |
| 7,512,879 | B2 * | 3/2009  | Weil et al. .................. 715/251 |
| 7,934,166 | B1 * | 4/2011  | Clark ......................... 715/784 |
| 2002/0186251 | A1 | 12/2002 | Himmel |
| 2002/0186252 | A1 | 12/2002 | Himmel |
| 2004/0268259 | A1 * | 12/2004 | Rockey et al. ............. 715/708 |
| 2007/0220443 | A1 * | 9/2007  | Cranfill et al. ............. 715/786 |
| 2008/0034319 | A1 * | 2/2008  | Hawkins ...................... 715/784 |
| 2008/0235616 | A1 * | 9/2008  | Neervoort .................. 715/784 |
| 2009/0019389 | A1 * | 1/2009  | Aust ........................... 715/786 |
| 2009/0138815 | A1 * | 5/2009  | Mercer ........................ 715/786 |
| 2009/0178008 | A1 * | 7/2009  | Herz et al. .................. 715/840 |

OTHER PUBLICATIONS

Ishak, Edward, et al., "Content-Aware Scrolling," Proceedings of User Interface Software & Technology (UIST 2006) Montreux, Switzerland, Oct. 2006, pp. 155-158.

* cited by examiner

*Primary Examiner* — William Bashore
*Assistant Examiner* — Henry Orr
(74) *Attorney, Agent, or Firm* — Anthony V.S. England (57) ABSTRACT

The invention addresses the need to view an entire document element, such as a photograph, paragraph, etc. when paging. A window generated by an application such as a browser includes a succession of document elements. The window has an actual top and an actual bottom. The computer system selects a paging step size automatically, wherein the paging step size is selected from a group. The group includes a first step size that is of a size such that paging downward by the first step size from the current window position advances the window to a location placing the top of the at least one document element a predetermined distance below the top of the window.

17 Claims, 10 Drawing Sheets

INTERNATIONAL NEWS – MOZILLA FIREFOX  
FILE EDIT VIEW HISTORY BOOKMARKS TOOLS HELP

DOCUMENT ELEMENT 13

U.N. Issues Warning on Food Crisis
Resolving the global food crisis could cost as much as $30 billion a year and wealthier nations are doing little to help the developing world, United Nations officials said.

Iran's Religious Leader Says Nuclear Program Is Peaceful

TOPICS IN THE NEWS

* People: Pope Benedict XVI » | President Bush »
* Subjects: Global Warming » | Oil and Gasoline » | Palestinians »
* Organizations: Group of 8 » | United Nations » | World Bank »
* Places: China » | India » | Iran » | Iraq » | Japan » | North Korea » | Turkey » | Venezuela »

Complete Coverage
* The Reach of War: Iraq & Afghanistan »

ADVERTISEMENT

Chávez Decree Tightens Hold on Intelligence
Sweeping changes to Venezuela's intelligence agencies have provoked concerns that citizens will be forced to inform on one another to avoid prison.

DONE

WINDOW 115

CONTEXT SENSITIVE PAGING

FIELD OF THE INVENTION

This invention relates to displaying information on a computerized device, and more particularly to enhanced paging of a window displayed by the device.

BACKGROUND

Most web pages include document elements, such as graphic images, of various sizes. When viewed in a browser window, lower portions of these document elements are often cut off, i.e., "cropped," at the bottom of the display. When the traditional "page down" button is pressed, or a page down operation is requested by another method, the page display is advanced by bringing the bottom of the previously displayed document element section to the top of the browser display window. If the document element is cropped at the bottom, this may then result in an upper portion of the document element being cropped at the top. In order to view the full document element, the user must manually manipulate the currently-displayed section of the web page to bring the full image into the display window. Thus, a need exists for improved paging, particularly since web browsing is now so frequently done with small-screen computerized devices such as personal digital assistants and cell phones.

Figure 1:
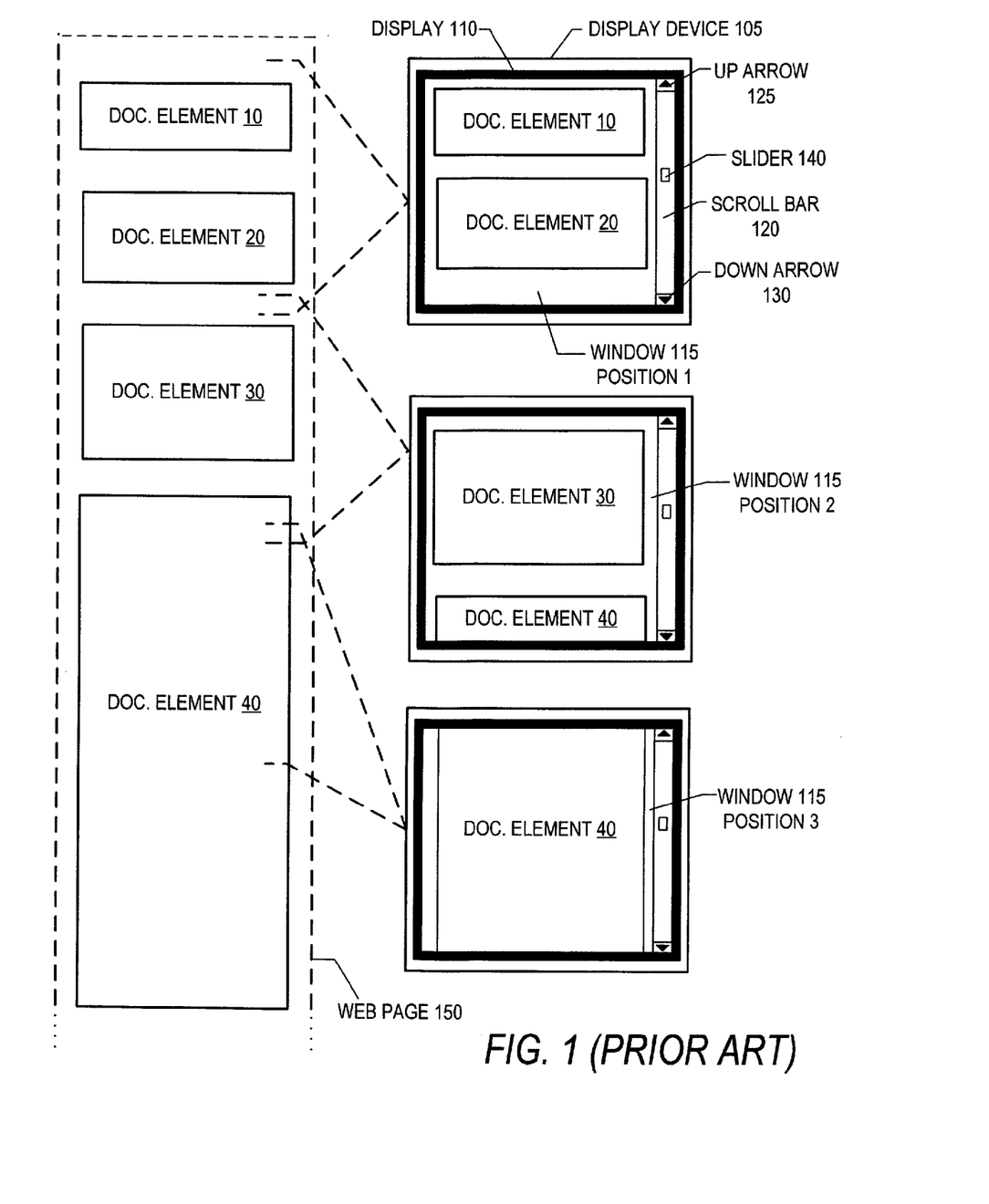
FIG. 1 illustrates paging in accordance with prior art.

Referring now to FIG. 1, in which paging is illustrated according to the prior art, on the left-hand side a web page 150 is illustrated. Web page 150 includes a succession of document elements, such as graphic images, of various sizes, four of which are shown, that is, document elements 1 through 4. On the right-hand side of the figure are shown three instances of a window 115 of a display 110 on a display device 105. In the illustration, the window 115 is shown filling nearly the entire display 110, but it should be understood that the window 115 may be much smaller, and that a number of windows can be open at one time on the display 110.

As the terms are used herein, display 110 is a physical portion of the display device 105 and has a fixed size, whereas the window 115 is a logical element of a size that the user may change. Each of the instances illustrates a respective position of the window 115 in which a portion of web page 150 is displayed. A computer program (not shown), such as a web browser in connection with an operating system, generates window 115. The program pages window 115 through web page 150, responsive to user commands from an input device (not shown) such as a mouse or keyboard. A touch screen and key pad are also common input devices for personal digital assistants which have relatively small displays.

Window 115 has a vertical page bar 120 since the vertical length of web page 150 exceeds that of the window 115. If the horizontal width of web page 150 were to exceed the horizontal width of window 115, then window 115 would also have a horizontal page bar. The one or more page bars provide means to page window 115 through web page 150 by clicking in page bar 120 below the current location of page bar 120 using an input device. Other page down methods include depressing a "page down" key or button and hitting a space bar.

In FIG. 1 the three instances shown are for three successive positions of window 115, where window 115 has been moved down using the "page down" key. Conventionally, when the user pages down through web page 150, display 110 is advanced by bringing the bottom of the previously displayed page section to the top of browser window 115. Each successive position begins at the last line of the previous position. That is, each position moves down by the amount of the vertical length of window 115. Referring now to the right side of FIG. 1, paging down from position 1 results in document element 40, being partially displayed in position 2 with the top section cropped off. Paging down from position 2 results in the top and bottom sections of document element 40 being cropped off. In order to view the full document element (such as a photo image), a manual manipulation of the currently-displayed section of web page 150 must be done to bring the full image into window 115.

SUMMARY

The invention addresses the foregoing need. A window is generated by a computer system for displaying information and paging through the information responsive to receiving a paging command. The window has an actual top and an actual bottom. The information includes at least one succession of document elements and in a current position the at least one document element is located within the window. The computer system selects a paging step size automatically, wherein the paging step size is selected from a group. The group includes a first step size that is of a size such that paging downward by the first step size from the current window position advances the window to a location placing the top of the at least one document element a predetermined distance below the top of the window. The group also includes a second step size that is of a size such that paging downward by the second step size from the current window position advances the window to a location placing the bottom of the at least one document element a predetermined distance above the bottom of the window. The group also includes a third step size that is of a size such that paging downward by the third step size from the current window position advances the window to a location placing a predetermined intermediate location within the at least one document element a predetermined distance above the bottom of the window. wherein the selecting of the paging step size is responsive to the location of the at least one document element within the window in the current position. The computer system pages downward by the selected step size responsive to the program operating in a context-sensitive paging mode and responsive to the computer receiving a paging command from a user, wherein the computer system displays the at least one document element in a next position responsive to the paging downward, the next position being determined by the selected step size.

In another aspect, the at least one document element has a top and a bottom and the selecting of a paging step size from a group includes selecting the first step size responsive to the at least one document element having a top portion not cropped by the window and a bottom portion cropped by the window. Further, the selecting includes selecting the second step size responsive to the at least one document element having top portion and bottom portions cropped by the window, wherein the document element's cropped bottom portion has a height less than the height of the window. Also, the selecting includes selecting the third step size responsive to the at least one document element having top portion and bottom portions cropped by the window, wherein the document element's cropped bottom portion has a height greater than or equal to the height of the window.

In another aspect, the first step size is determined according to a predetermined formula wherein, according to the formula, the first step size equals the distance from the top of the document element to a top of the window.

In another aspect, the window top is an effective top.

In another aspect, the first step size is determined according to a predetermined formula wherein, according to the formula, the second step size equals the height of the bottom portion of the document element that is cropped off.

In another aspect, the first step size is determined according to a predetermined formula wherein, according to the formula, the third step size equals an effective height of the window.

System and computer program products corresponding to the above summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG's 3A and 3B illustrate further details of paging down through a succession of document elements, in accordance with an embodiment of the present invention.

DETAILED DESCRIPTION

The claims at the end of this application set out novel features which applicants believe are characteristic of the invention. The invention, a preferred mode of use, further objectives, and advantages, will best be understood by reference to the following detailed description of an illustrative embodiment read in conjunction with the accompanying drawings. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Figure 2A:
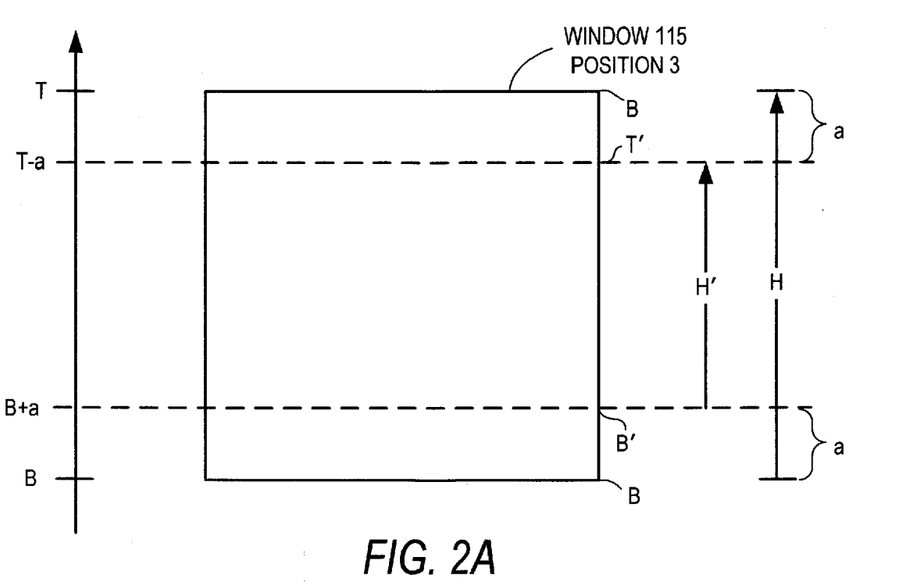
FIG. 2A illustrates certain aspects of locations within a browser window that relate to cropping according to an embodiment of the present invention.

Referring now to FIG. 2A, details of locations within window 115 that relate to paging are shown, according to an embodiment of the invention. Window 115 has actual top T and actual bottom B. The computer system determines an effective top T' and an effective bottom B' of window 115, wherein effective top T' is below actual top T and effective bottom B' is above actual bottom B by at least respective predetermined amounts, which are shown as "a" in FIG. 2A, although the predetermined amounts do not necessarily have to be equal to one another. Thus, the effective height of window 115 is shown as H'=H−2a in FIG. 2A.

In an embodiment of the invention, for paging upward a computer system determines that a document element is cropped at the top of the document element responsive to the document element having a top portion that extends above effective top T' of window 115, i.e., the document element top is higher than T−a, in FIG. 2A for example. And for paging downward the computer system determines a document element is cropped at the bottom of the document element responsive to the document element having a bottom portion that extends below effective bottom B' of window 115, i.e., the document element bottom is lower than B+a, in FIG. 2A for example.

More generally, in various embodiments of the invention a computer system determines that a document element is cropped responsive to whether the document element extends beyond one or both of the effective top or bottom, i.e., limits, of the window 115 or else responsive to whether the document element extends beyond one or both of the window's actual limits. In other words, in one embodiment of the invention a document element is deemed cropped at the top if the document element's top is above the window's effective top, while in another the document element is deemed cropped if the document element's top is above the window's actual top. Likewise, the document element is deemed cropped in one embodiment if it extends below the effective bottom of the window 115 and cropped in another embodiment if it extends below the actual bottom. In some embodiments of the invention the computer system always determines cropping responsive to the document element's position relative to the window's actual limits and uses the window's effective limits merely for determining paging step size. That is, the computer system determines the step size for paging responsive to the position of a selected location in the document element relative to the window's effective limits. For example, in one embodiment the paging step size moves the document element so that a selected location in the document element aligns with window 115 effective bottom and in another embodiment the paging step size moves the document element so that a selected location in the document element aligns with window 115 effective top.

As described in one example herein above, in some embodiments of the invention, the computer system determines whether cropping is relative to the window's effective limits or actual limits depending on the paging direction. To elaborate, in one embodiment the document element is deemed cropped at the bottom if it extends merely below the window's effective bottom if the paging is downward, but not if the paging is upward. In another embodiment, the reverse is true, i.e., the document element is deemed cropped at the bottom if it extends merely below the window's effective bottom if the paging is upward, but not if the paging is downward. Likewise, in one embodiment the document element is deemed cropped at the top if it extends merely above the window's effective top if the paging is upward, but not if the paging is downward. And in still another embodiment the reverse is again true.

Aside from the matter of whether cropping and paging are relative to effective or actual window limits, it should also be understood that distance a may be extremely small relative to H, such that as far as the viewer may detect H' is essentially=H, and T' is essentially the same as the top T of window 115, and B' is essentially the same as the bottom B of window 115. In other embodiments distance a may be larger.

Figure 2B:
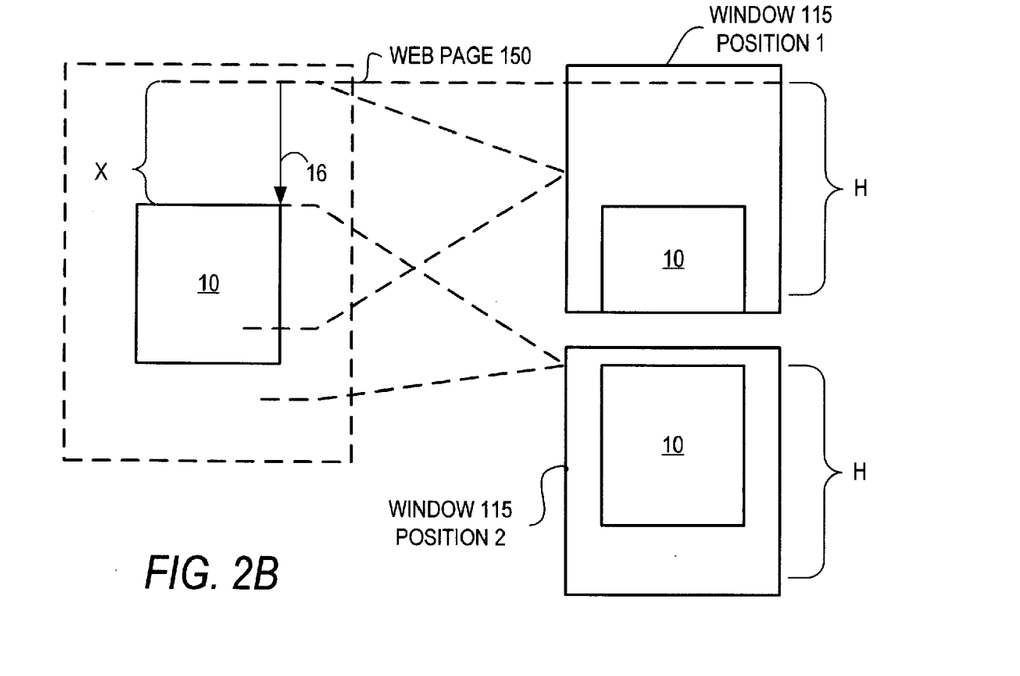
FIGS. 2B, 2C and 2D illustrate paging by three different step sizes in three different circumstances, according to an embodiment of the present invention.
Figure 2C:
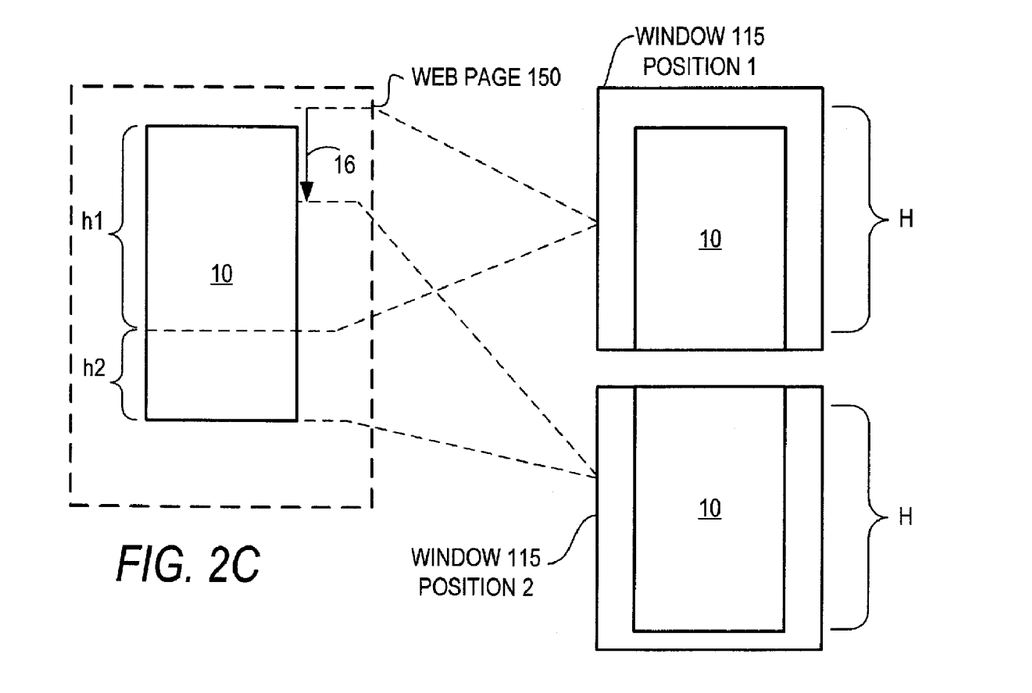
Figure 2D:
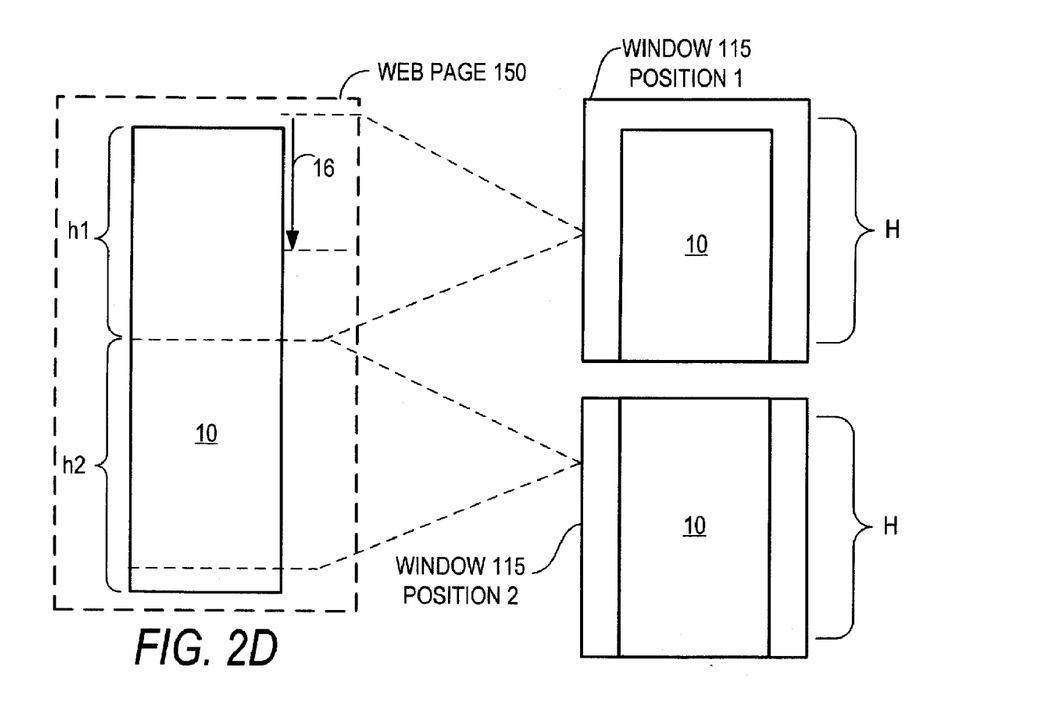

Turning now to an illustration of one of the above described embodiments of the invention, in the embodiment of the invention illustrated in FIGS. 2B, 2C and 2D, the computer system determines cropping relative to the actual limits of window 115, but determines paging step sizes in at least some instances by also taking into account effective limits of window 115. In the instances illustrated in FIG. 2B, the computer system determines an effective top T' and an effective bottom B' of window 115, and the height of window 115 that the computer system uses to determine paging step sizes may be an effective height H', i.e., the distance between T' and B'. In the instance shown in FIG. 2B, window position 1, document element 10 has a top portion not cropped by window 115 and a bottom portion cropped by window 115. The computer system computes the selected first step size according to a predetermined formula, wherein, for example, step size=x, the distance from the top of document element 10 to effective top T' of window 115, since this step size advances the window to a location placing the top of document element 10 a predetermined distance, a, below the top of the window. That is, in window position 2, the top of document element 10 is at effective top T'.

In instances shown in FIG. 2C (again, with the understanding that height H of window 115 that the computer system uses to determine paging step sizes is an effective height H'), document element 10 has a top portion (height h1) and a bottom portion (height h2) cropped by window 115, wherein the cropped bottom portion's height h2 is less than height H' of window 115. Responsive to this situation, the computer selects the second step size for paging downward. The computer system computes the selected second step size according to a predetermined formula, wherein step size=h2, i.e., the height of the bottom portion of document element 10 that is cropped off by the effective bottom B' of window 115 in the first position illustrated, since this step size will advance the window to a location placing the bottom of document element 10 a predetermined distance, a, above bottom B of window 115. That is, in position 2, the bottom of document element 10 is at effective bottom B'.

A situation is shown in FIG. 2D (again, with the understanding that height H of window 115 that the computer system uses to determine paging step sizes is an effective height H'), where document element 10 has a top portion (height h1) and a bottom portion (height h2) cropped by window 115, and wherein the cropped bottom portion's height h2 is greater than the height H' of window 115. Responsive to this situation, the computer system selects the third step size for paging downward. In this embodiment, the computer system computes the selected third step size according to a predetermined formula, wherein step size=H', i.e, the effective height of the window, since this step size will advance the window so that a location in document element 10 that was at the effective bottom B' of window 115 in position 1 is at the effective top T' of window 115 in position 2.

The arrangement of effective top and effective bottom shown in FIG. 2A provides for some overlap of information that is displayed from one window position to the next when paging through the information, wherein the amount of overlap increases as the distances increase between the top and effective top and between the bottom and effective bottom. Overlap caused by these distances isn't absolutely necessary in all cases. For example, when the above described arrangement according to the present invention is applied to the display of paragraphs, if a paragraph ends at the bottom of a window, there's no absolute need to redisplay any of it, since when a paragraph extends past the bottom of the window and the window is paged down, the arrangement places the start of that paragraph at the top of the next window, according to an embodiment of the invention. However, the overlap is particularly useful in some situations, such as when a document element is close to the size of the window. For example, if the distances between the top and effective top and between the bottom and effective bottom in FIG. 2A are small, and if the top of a document element is slightly larger than the size of the window and slightly below the effective top of the window, so that the bottom of the document element is cropped by a very small amount, then paging according to the illustrated embodiment of the present invention may be almost imperceptible to the user or may appear to be an error. That is, paging downward a first time in this situation will cause one very small step to the top of the document element, and paging downward a second time will cause another very small step to its bottom. It creates more overlap of information within the window from one page to the next to have larger distances between the top and effective top and between the bottom and effective bottom. This tends to ameliorate the above described situation wherein paging may be by only a very small amount and may appear to be an error.

Figure 3A:
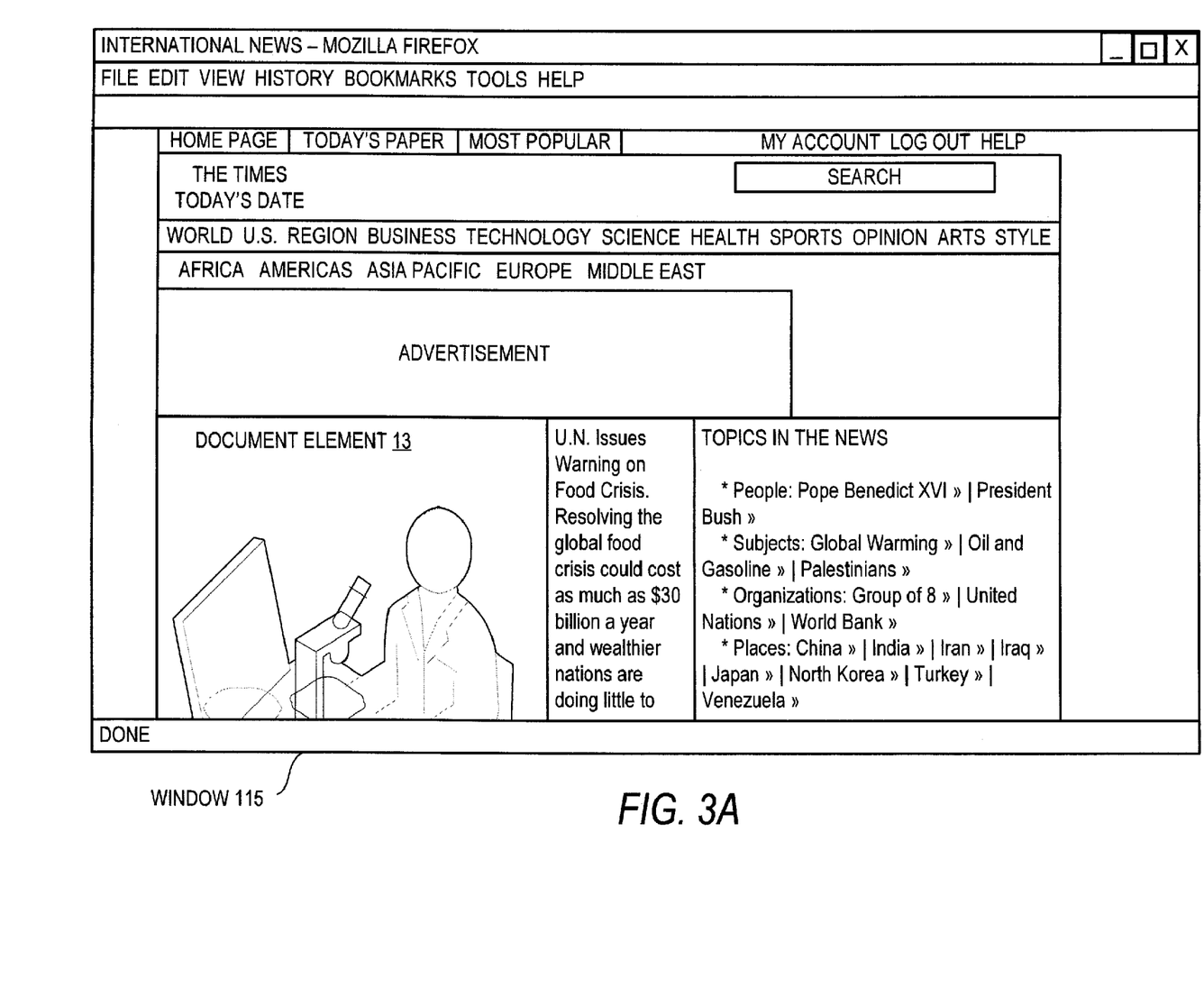
Figure 3B:
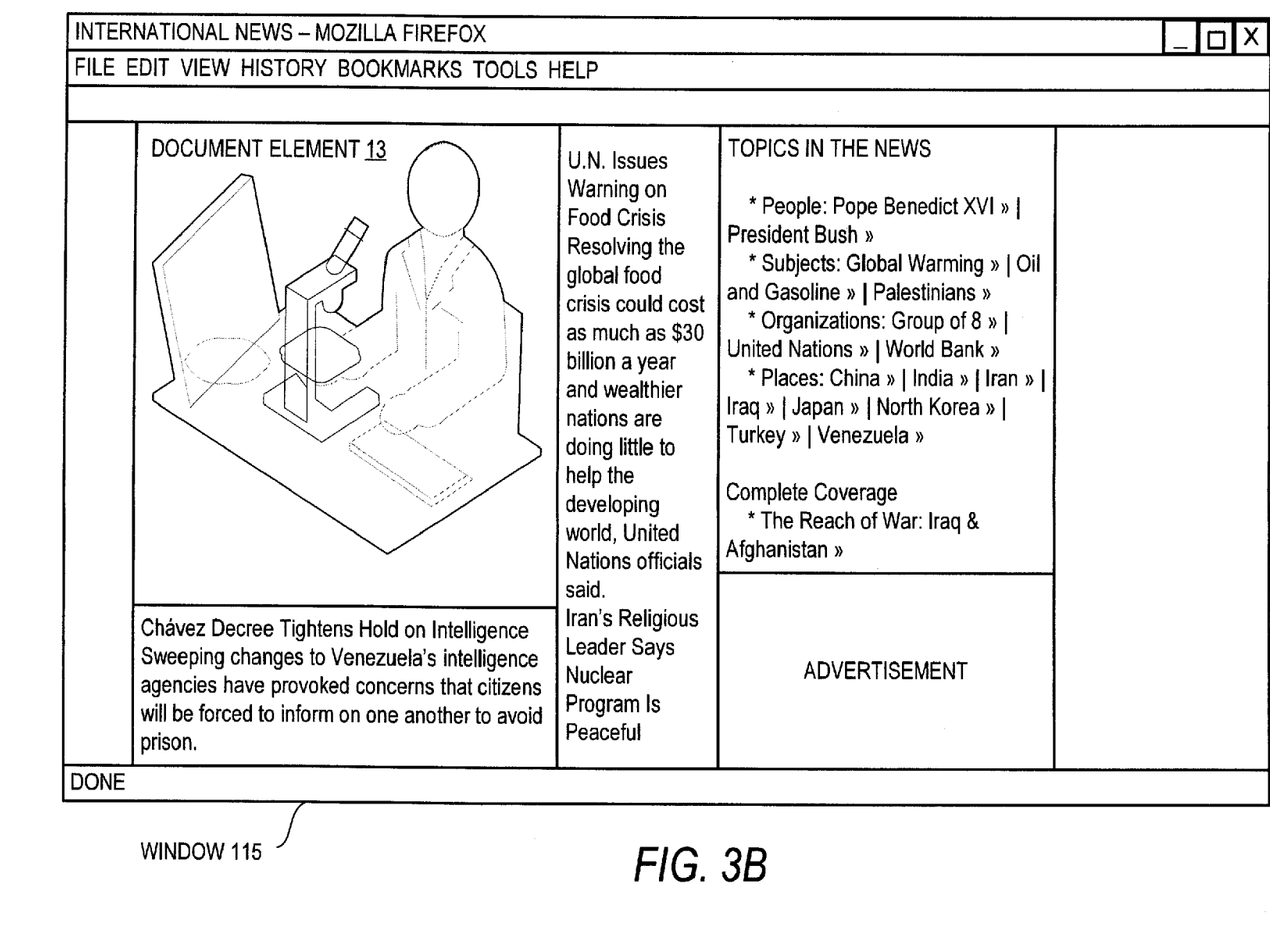

Referring now to FIGS. 3A and 3B, aspects of paging according to an embodiment of the present invention are illustrated for window 115. In this case, window 115 is running a web browser application, with a relatively large document element 13, a photographic image in this example. FIG. 3A illustrates the situation where, in the currently loaded web page 150, document element 13 begins below the top of window 115 and is cropped at the bottom of window 115. According to the invention, when the user next pages down, window 115 moves to a next position shown in FIG. 3B in which display 110 advances to the location corresponding to the top of document element 13. So, in FIG. 3B the top of the window 115 begins at the top of document element 13.

Figure 4A:
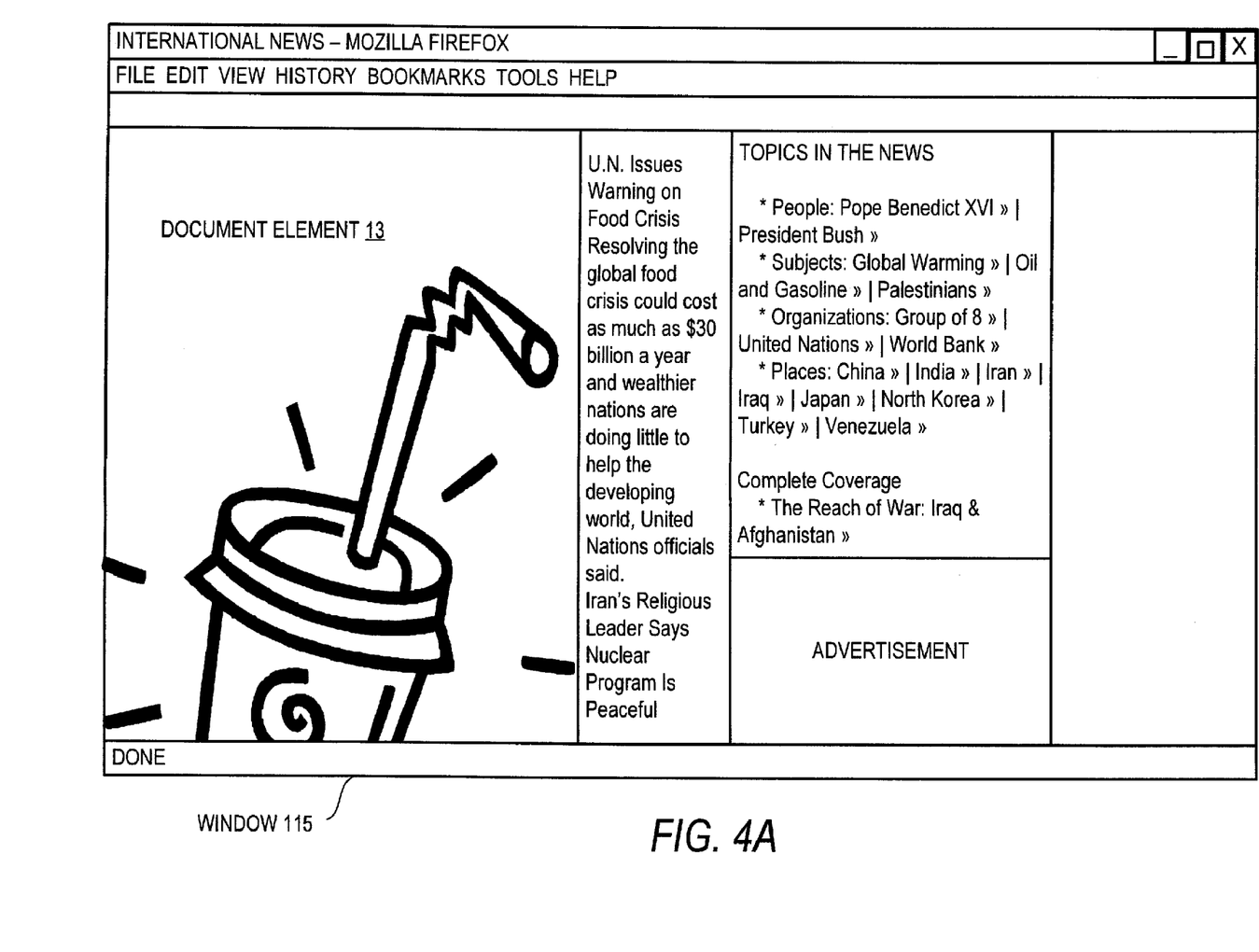
FIGS. 4A and 4B illustrate further details of paging down through a succession of document elements, in accordance with an embodiment of the present invention.
Figure 4B:
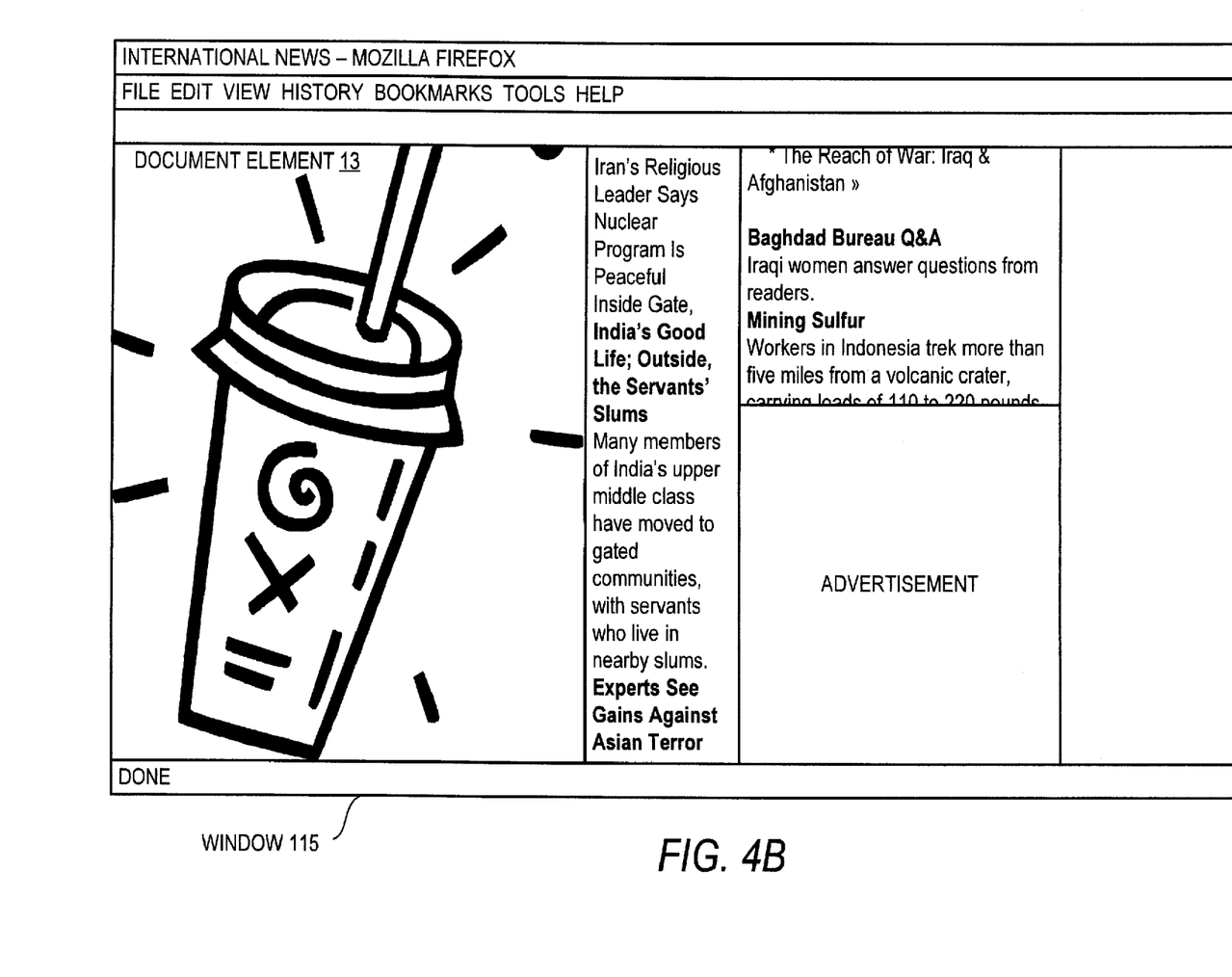

Referring now to FIGS. 4A and 4B, aspects of paging according to an embodiment of the present invention are illustrated for window 115. In this case, window 115 is again running a web browser application that includes a relatively large document element 13, a photographic image. FIG. 4A illustrates the situation where, in the currently loaded web page 150, document element 13 begins at the top of window 115 and extends in window 115 by less than the height of window 115. According to the invention, when the user next pages down, window 115 moves to a next position shown in FIG. 4B in which display 110 advances to the location corresponding to the bottom of document element 13.

Figure 5:
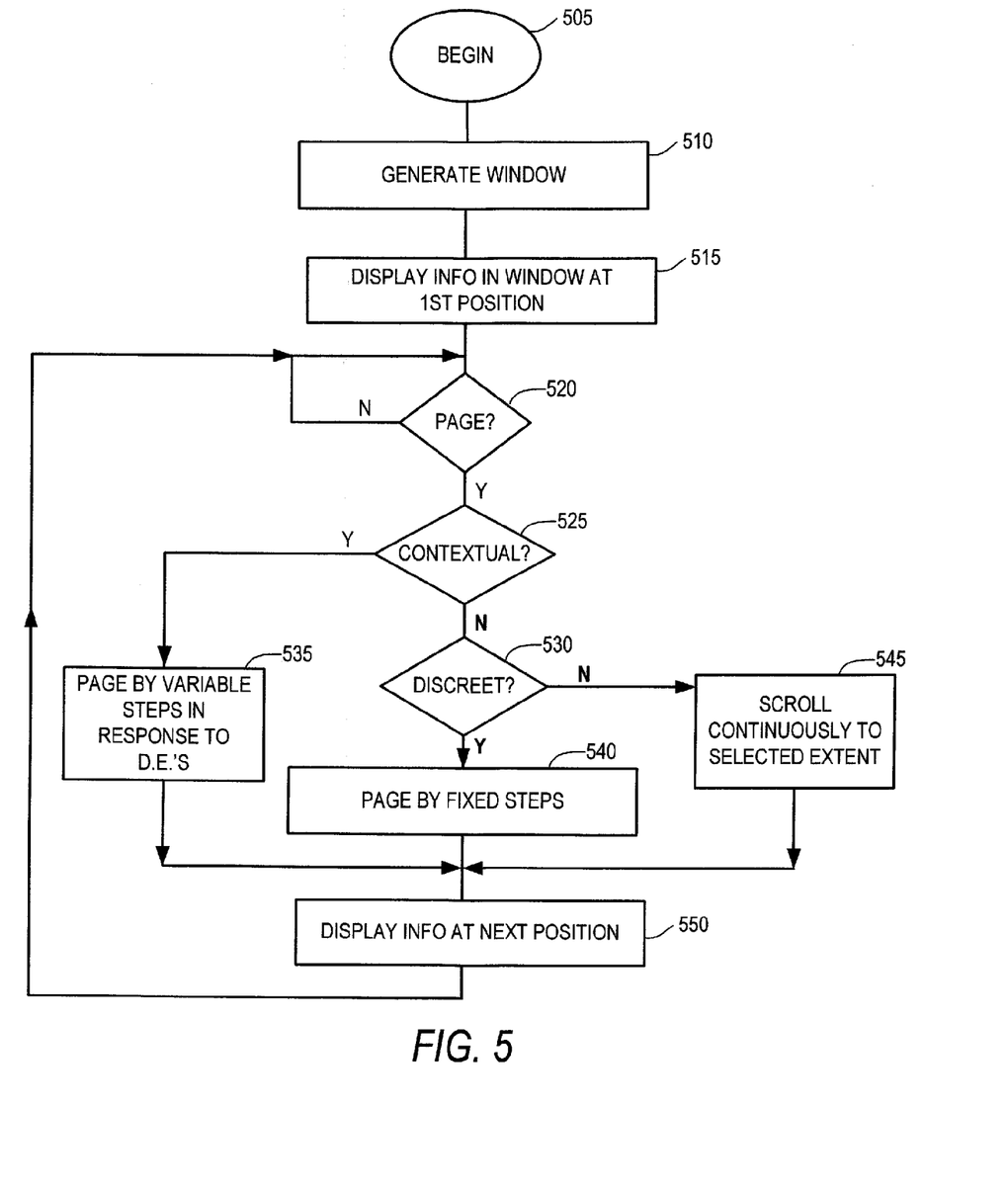
FIG. 5 illustrates certain aspects of a computer program for an embodiment of the present invention, including selection of different paging modes.
Figure 6:
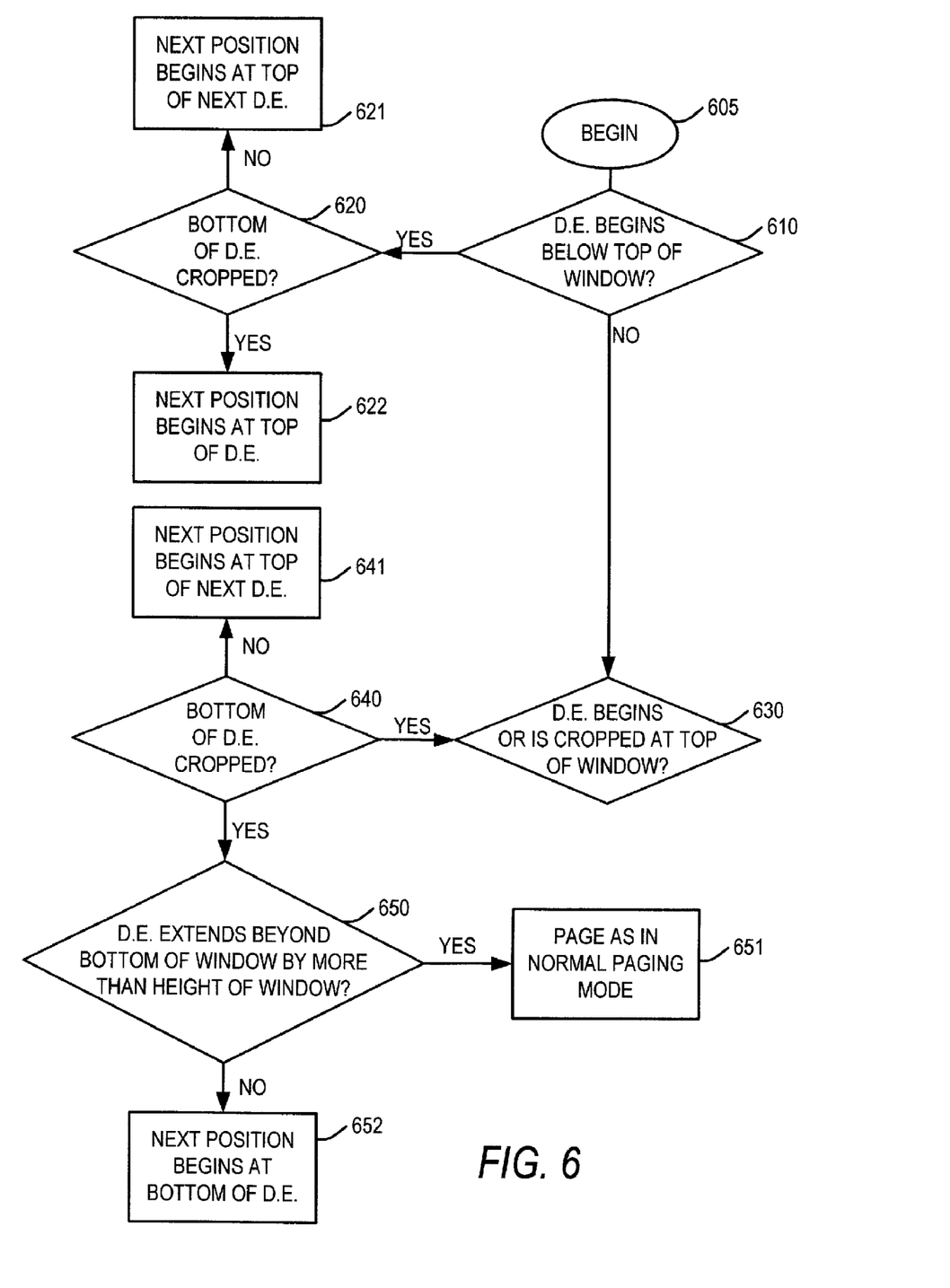
FIG. 6 illustrates certain aspects of determining the variable step size, according to an embodiment of the present invention.

Referring now to FIG. 5, certain aspects of a computer algorithm are illustrated for an embodiment of the present invention (Document Element is abbreviated to D.E. In FIGS. 5 and 6). In this and the other algorithms described in this application it should be understood that events depicted do not necessarily have to occur in the sequence illustrated in the figures. The algorithm could be implemented, for example, in base browser software or in an installable plug-in module which enables the capability of paging responsive to document elements that have been determined to have been partially cropped. An internal calculation in the browser itself (or a browser plug-in object) combines the known parameters of the available window 115 size, the current position of the document element, and an indication of whether a displayed document elements is cropped at the top of bottom of window 115.

The algorithm begins at 505, and generates a window at 510. At 515 information is displayed in the window for a first position. At 520 the algorithm monitors for a paging command from the user. When a paging command is detected, then at 525 the algorithm determines whether the program is operating in a contextual paging mode. If not, then depending on whether the paging command input is from a discrete step input device or a pointing device at 530, the algorithm pages by fixed paging steps at 540 responsive to the discrete step input device, or pages continuously to the extent selected by the pointer input device at 545.

If context sensitive paging mode has not been disabled, then paging occurs by a selective paging step sizes at 535, where determining the paging step sizes and selecting among the paging step sizes are both responsive to the content of the information being displayed relative to the window in which the information is displayed. This may even include paging by dragging slider 140, according to the embodiment. That is, for context sensitive paging under control of the pointer the window does not move continuously through the document. For example, if the pointer drags the slider downward a vertical distance that is many times greater than the vertical length of the window, the window steps down through the document numerous times, pausing at least briefly after each step to display the information at the appropriate contextually-determined point.

Thus, even under pointer control, paging is by discrete steps and includes at least automatic pauses. The speed and extent of paging affects the duration of the pauses. If the paging is slow, e.g., the slider is dragged slowly, the pauses are long, but if the paging is fast the pauses are more brief. If the slider is dragged or auto paged a shorter distance the pauses are longer, but if the slider is dragged or autopaged a longer distance the pauses are more brief.

It should be understood from the foregoing that the same user paging command will cause window 115 to page by a fixed size paging step if context sensitive paging mode is disabled, but will cause window 115 to page by a variable size paging step if context sensitive paging mode is not disabled. In the prior art, as illustrated in FIG. 1, paging by the keyboard conventionally causes window 115 to page in fixed steps; that is, window 115 jumps in discrete steps through web page 150 one line at a time, in the case of pressing the "down arrow" key, or one window at a time, in the case of pressing the "page down" key, etc. However, according to an embodiment of the present invention, in the context sensitive paging mode the "page down" key causes paging to move document element-by-document element, as has been described above. Referring now to FIG. 6, certain aspects of determining the paging step sizes for downward paging are illustrated, according to an embodiment of the present invention. The algorithm begins at 605, and at 610 determines for the current position of the window whether a top most document element begins below the top of the window. If the document element begins below the top of the window, the algorithm at 620 determines whether a bottom portion of the document element beginning below the top of the window is cropped at the bottom of the window. If the document element is shown in its entirety, i.e., is not cropped, then at 621 the algorithm determines a step size such that after applying that step size to a current window position the top of the window will begin at the top of the next document element in the next window position. If the bottom of the top most document element is cropped, then at 622, the algorithm determines that in the next position, the top of the window will begin at the top of that document element.

If, at 610, the document element is cropped at the top of the window, then at 630 the algorithm determines whether the document elements begins at or is cropped at the top of the window. If yes, the algorithm at 640 determines whether the bottom of the document element is cropped at the bottom of the window. If the bottom is not cropped, then at 641, the algorithm determines that in the next position the top of the window will begin at the top of the next document element. If the bottom is cropped, then at 650, the algorithm determines whether the document element extends beyond the bottom of the window by more than the height of the window. If yes, at 651, a standard paging (i.e., non-context sensitive paging) is performed, advancing the cursor to the position currently at the bottom of the window. If the document element does not extend beyond the bottom of the window by more than the height of the window, then the algorithm at 652 determines that the next position begins at the bottom of the document element.

Referring now to FIG. 4, another aspect of the alternative embodiment is shown. In FIG. 4 document element 20 is cropped at the bottom of window 115 in position 401. In this position the bottom-most displayed sentence is displayed in its entirety. Because the bottom-most sentence in position 401 is not cropped, in the next position downward, position 402, the top of window 115 is at the beginning of the next sentence after the sentence that is position 401's bottom-most sentence. Downward paging is described in the examples used herein, but it should be understood that the description applies equally to horizontal or upward paging. Also the content to which the contextual paging responds is described as document elements. It should be understood however that the invention applies to a wide variety of document elements, including but not necessarily limited to one of the following document elements: sections, divisions, chapters, rows, columns, cells, hypertext links, or pictorial images, etc. The invention applies to a wide variety of programs for generating such document elements, including but not necessarily limited to any of the following application programs: word processor, web browser, spreadsheet, electronic book reader, or data base applications. Likewise, the description herein has largely referred to a "web page" that window 115 pages through. It should be understood that the invention is applicable to a wide variety of information besides documents such as those created and edited by word processor applications. The invention is applicable to information including but not necessarily limited to the following: web pages, spreadsheets, databases, books, magazines, newspapers, audio books, voice mail, audio recordings, audio-video recordings, etc.

In an additional aspect, since there are quite a number of types of document elements, in one embodiment a user preference selection menu is provided. The user may use this menu to select types of document elements to which the paging responds. The user preferences selection menu also includes a default set of document element types which the user may elect to accept instead of personally selecting document elements.

Figure 7:
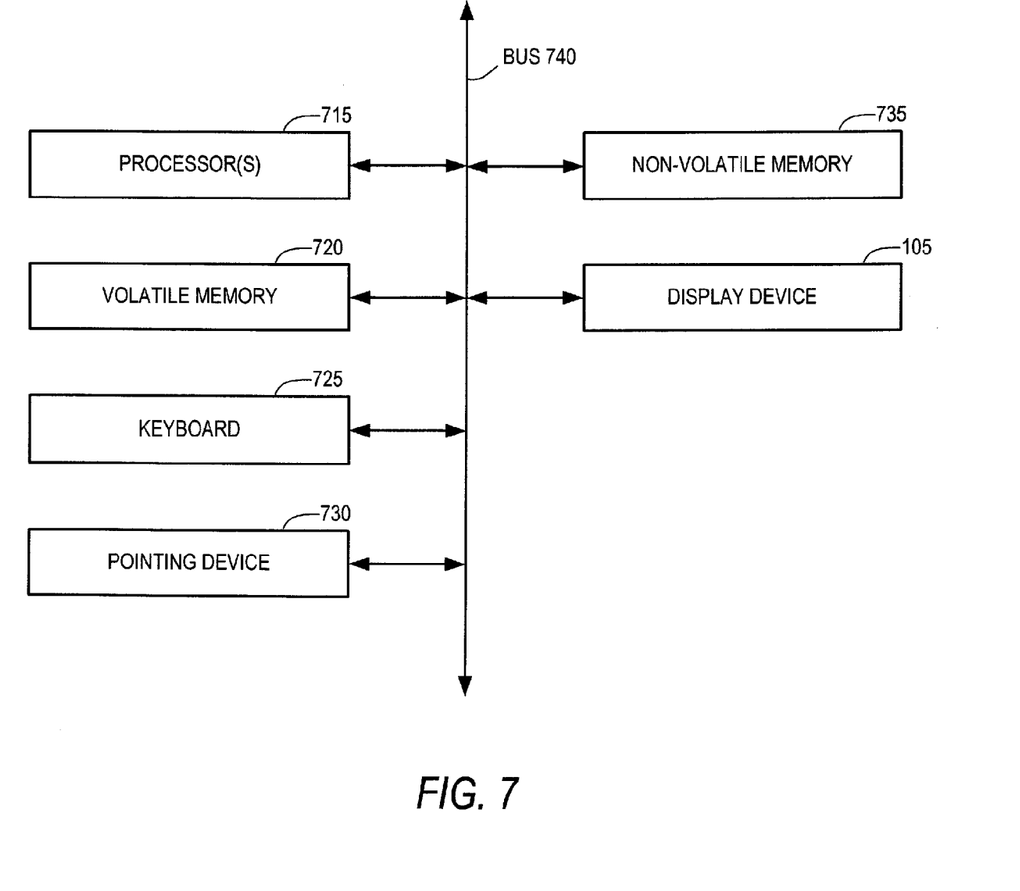
FIG. 7 illustrates a computerized device for displaying and paging through information, in accordance with an embodiment of the present invention.

Referring now to FIG. 7, a computerized device 710 is shown that is generally applicable for the embodiment described. computer 710 has a processor 715, a volatile memory 720 (that is, RAM), a keyboard 725, a pointing device 730, a nonvolatile memory 735 (for example, ROM, hard disk, floppy disk, CD-ROM, etc.), and a display device 105. memory 720 and 735 are for storing a program for controlling processor 715, and the processor is operative with the program to perform as described herein. display device 105 shown could use a cathode ray tube ("CRT"), liquid crystal, field emission device, or some other type of document element. These components in device 710 are interconnected by bus 740. The keyboard is a discrete step input device. In other embodiments a discrete step input device is a microphone for receiving voice commands, or a keypad. In other embodiment, display device 105 is an audio device, and in the context sensitive paging mode the paging operations are responsive to content of an audio recording, such as a pause in the sound, a verse, a stanza, a refrain, an interlude, a movement, a chorus, etc. In another embodiment, the display device 105 is an audio-video device, and in the context sensitive paging mode the paging operations are responsive to content of an audio-video recording, such as an act, a scene, a commercial, a quarter, half, highlight, play or time out of a sporting event, etc. In another aspect, if the user or developer of information creates bookmarks in the information, the paging operations are responsive to the bookmarks.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory and recordable-type media, where recordable-type media includes memory such as a floppy disk, a hard disk drive, ROM, and CD-ROM. Instructions may also be delivered by transmission-type media, which includes media such as digital and analog communications links, e.g., the Internet.

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention and its practical applications, and to enable others of ordinary skill in the art to understand the invention. Various other embodiments having various modifications may be suited to a particular use contemplated, but may be within the scope of the present invention.

As mentioned herein above, in the embodiments of the invention illustrated in FIG's 2B, 2C and 2D, the computer system determines cropping relative to the actual limits of window 115. However, it should be understood that these illustrations are sufficient to enable one of ordinary skill in the art to practice the invention in all the described embodiments, given the detailed explanations herein.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

What is claimed is:

1. A method in a computer program for paging, comprising:
generating a window in a computer system for displaying information and paging through the information, the window having a top and a bottom wherein the information includes at least one document element and wherein in a current position the at least one document element is located within the window and wherein the at least one document element has a top and a bottom;
operating the computer system in a context-sensitive paging mode;
selecting, in the context-sensitive paging mode, paging step sizes automatically by the computer system based upon respective locations of the at least one document element within the window in respective instances of the current position, wherein the selecting comprises:
selecting a first step size based on the at least one document element having a top portion not cropped by the window and a bottom portion cropped by the window such that paging downward by the first step size from the current window position moves the top of the at least one document element up to a predetermined distance below the top of the window; and
selecting a second step size based on the at least one document element having top and bottom portions cropped by the window, wherein the document element's cropped bottom portion has a height less than the height of the window such that paging downward by the second step size from the current window position advances the window to a location placing the bottom of the at least one document element a predetermined distance above the bottom of the window; and
a third step size based on the at least one document element having top and bottom portions cropped by the window, wherein the document element's cropped bottom portion has a height greater than or equal to the height of the window such that paging downward by the third step size from the current window position advances the window to a location placing a predetermined intermediate location within the at least one document element a predetermined distance above the bottom of the window;
and
paging downward by the selected step size by the computer system responsive to the program receiving paging commands, wherein the computer system displays the at least one document element in respective next positions responsive to respective instances of the paging downward, the next position being determined by the respective selected step sizes.

2. The method of claim 1, comprising determining the first step size according to a predetermined formula wherein, according to the formula, the first step size equals the distance from the top of the document element to a top of the window.

3. The method of claim 2, wherein the distance from the top of the document element to a top of the window is a distance from the top of the document element to an effective top of the window.

4. The method of claim 1, comprising determining the second step size according to a predetermined formula wherein, according to the predetermined formula for the second step size, the second step size equals the height of the bottom portion of the document element that is cropped off.

5. The method of claim 1, comprising determining the third step size according to a predetermined formula wherein, according to the predetermined formula for the third step size, the third step size equals an effective height of the window.

6. A computer program, stored on a non-transitory computer readable medium, for paging, the computer program comprising instructions for execution by a computer, wherein the instructions, when executed by the computer, cause the computer to implement a method comprising:
generating a window, for displaying information and paging through the information responsive to receiving a paging command, wherein the window has a top and a bottom;
operating the computer in a context-sensitive paging mode;
paging the window by a variable step size in the context-sensitive paging mode and responsive to the program receiving the paging command, wherein the variable step size is based on to content of the information displayed, wherein the information includes a succession of document elements and in a current position the window displays a first portion of the information beginning at the top of the window and ending at the bottom of the window, wherein the document elements have respective tops and bottoms and wherein the paging the window by a variable step size responsive to the program operating in a context-sensitive paging mode and responsive to the program receiving the paging command includes:

paging downward, wherein when in the current position of the window a document element that begins below the top of the window is cropped at the bottom of the window, the variable step size adjusts based on the document element so as to move the top of the window down to the top of the document element;

paging downward, wherein when in the current position of the window a document element begins or is cropped at the top of the window and extends beyond the bottom of the window by less than the height of the window, the variable step size adjusts based on the document element so as to move the bottom of the cropped element up to the bottom of the window; and paging downward, wherein when in the current position of the window a document element begins or is cropped at the top of the window and extends beyond the bottom of the window by more than the height of the window, the window is paged by a fixed step size.

7. The computer program of claim 6, wherein the method implemented by the computer executing the instructions of the computer program includes:

paging upward, wherein when in the current position of the window a document element that ends above the bottom of the window is cropped at the top of the window, the variable step size adjusts based on the document element so as to advance the bottom of the window to a location corresponding to the bottom of the document element;

paging upward, wherein when in the current position of the window a document element ends or is cropped at the bottom of the window and extends beyond the top of the window by less than the height of the window, the variable step size adjusts based on the document element so as to advance the window to a location placing the top of the cropped element at the top of the window; and paging upward, wherein when in the current position of the window a document element ends or is cropped at the bottom of the window and extends beyond the top of the window by more than the height of the window, the window is paged by a fixed step size.

8. The computer program of claim 6, wherein the method implemented by the computer executing the instructions of the computer program includes:

determining the first step size according to a predetermined formula wherein, according to the formula, the first step size equals the distance from the top of the document element to a top of the window.

9. The computer program of claim 8, wherein the distance from the top of the document element to a top of the window is a distance from the top of the document element to an effective top of the window.

10. The computer program of claim 7, wherein the method implemented by the computer executing the instructions of the computer program includes:

determining the second step size according to a predetermined formula wherein, according to the second step sized predetermined formula, the second step size equals the height of the bottom portion of the document element that is cropped off.

11. The computer program of claim 7, wherein the method implemented by the computer executing the instructions of the computer program includes:

determining the third step size according to a predetermined formula wherein, according to the third step size predetermined formula, the third step size equals an effective height of the window.

12. A computer system comprising:

a processor; and a storage device connected to the processor, wherein the storage device has stored thereon a paging program for controlling the processor, and wherein the processor is operative to execute instructions of the program to implement a method comprising:

generating a window, for displaying information and paging through the information responsive to receiving a paging command, wherein the window has a top and a bottom;

paging the window by a variable step size with the program operating in a context-sensitive paging mode and responsive to the program receiving the paging command, wherein the variable step size is based on content of the information displayed, wherein the information includes a succession of document elements and in a current position the window displays a first portion of the information beginning at the top of the window and ending at the bottom of the window, wherein the document elements have respective tops and bottoms and wherein the paging the window by a variable step size with the program operating in the context-sensitive paging mode and responsive to the program receiving the paging command includes:

paging downward, wherein when in the current position of the window a document element that begins below the top of the window is cropped at the bottom of the window, the variable step size adjusts based on the document element so as to move the top of the window down to the top of the document element;

paging downward, wherein when in the current position of the window a document element begins or is cropped at the top of the window and extends beyond the bottom of the window by less than the height of the window, the variable step size adjusts based on the document element so as to move the bottom of the cropped element up to the bottom of the window, and;

paging downward, wherein when in the current position of the window a document element begins or is cropped at the top of the window and extends beyond the bottom of the window by more than the height of the window, the window is paged by a fixed step size.

13. The computer system of claim 12, wherein the method implemented by the computer executing the instructions of the program includes:

paging upward, wherein when in the current position of the window a document element that ends above the bottom of the window is cropped at the top of the window, the variable step size adjusts based on the document element so as to advance the bottom of the window to a location corresponding to the bottom of the document element, or;

paging upward, wherein when in the current position of the window a document element ends or is cropped at the bottom of the window and extends beyond the top of the window by less than the height of the window, the variable step size adjusts based on the document element so as to advance the window to a location placing the top of the cropped element at the top of the window, and;

paging upward, wherein when in the current position of the window a document element ends or is cropped at the bottom of the window and extends beyond the top of the window by more than the height of the window, the window is paged by a fixed step size.

14. The computer system of claim 12, wherein the method implemented by the computer executing the instructions of the program includes:
 determining the first step size according to a predetermined formula wherein, according to the formula, the first step size equals the distance from the top of the document element to a top of the window.

15. The computer system of claim 14, wherein the distance from the top of the document element to a top of the window is a distance from the top of the document element to an effective top of the window.

16. The computer system of claim 13, wherein the method implemented by the computer executing the instructions of the program includes:
 determining the second step size according to a predetermined formula wherein, according to the predetermined formula for the second step size, the second step size equals the height of the bottom portion of the document element that is cropped off.

17. The computer system of claim 13, wherein the method implemented by the computer executing the instructions of the program includes:
 determining the third step size according to a predetermined formula wherein, according to the predetermined formula for the third step size, the third step size equals an effective height of the window.

* * * * *